(12) United States Patent
Chang

(10) Patent No.: US 7,385,773 B2
(45) Date of Patent: Jun. 10, 2008

(54) ELECTRONIC DEVICE WITH PORTABLE OPTICAL MODULE

(75) Inventor: Keng-Ming Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/608,600

(22) Filed: Dec. 8, 2006

(65) Prior Publication Data

US 2007/0159534 A1    Jul. 12, 2007

(30) Foreign Application Priority Data

Jan. 6, 2006    (CN) .................. 2006 1 0032805

(51) Int. Cl.
*G02B 7/02* (2006.01)
*G03B 17/00* (2006.01)

(52) U.S. Cl. .................. 359/819; 359/811; 396/529

(58) Field of Classification Search ................ 359/811, 359/819, 822, 825, 830, 694; 348/335, 340, 348/345, 357, 211.14, 208.7, E5.027, E5.028; 396/55, 89, 133, 219, 268, 328, 389, 529; 324/157; 250/239

See application file for complete search history.

(56) References Cited

U.S. PATENT DOCUMENTS

| | | | |
|---|---|---|---|
| 4,491,793 A | * | 1/1985 | Germer et al. ............... 324/157 |
| 7,031,083 B2 | | 4/2006 | Chen |
| 2006/0285003 A1 | * | 12/2006 | Chang ........................ 348/335 |
| 2007/0122145 A1 | * | 5/2007 | Chang ........................ 396/529 |

* cited by examiner

*Primary Examiner*—Loha Ben
(74) *Attorney, Agent, or Firm*—Jeffrey T. Knapp

(57) ABSTRACT

An electronic device with a portable optical module (100) is provided. The electronic device includes a main body (10) having a camera module (20) incorporated therein, an optical element (40), a holder (50) and a magnetic assembly (30). The optical element can be an optical filter. The holder is annular-shaped and defines a through hole therein for accommodating the optical element therein. The magnetic assembly includes a first part coupled to the holder and a second part coupled to the camera module. The first part is configured for magnetic attachment to the second part, thus removably coupling the holder with the optical element to the camera module.

11 Claims, 1 Drawing Sheet

ELECTRONIC DEVICE WITH PORTABLE OPTICAL MODULE

BACKGROUND

1. Technical Field

The invention relates generally to electronic devices having photographic functions, and more particularly to an electronic device with a portable optical module.

2. Description of Related Art

Currently, digital camera modules are in widespread use in a variety of portable electronic devices. Most portable electronic devices are becoming progressively more miniaturized over time, and digital camera modules are correspondingly becoming smaller and smaller. For example, digital camera modules are now widely available as a feature of a mobile phone, notebook and personal digital assistant (PDA). Nevertheless, in spite of the small size of a contemporary digital camera module, consumers still demand excellent imaging. The quality of the image provided is mainly dependent upon the optical elements of the digital camera modules.

A digital camera module typically includes a lens module, a barrel and an image sensor, etc. The image sensor uses a charge-coupled device (CCD), a complementary metal oxide semiconductor (CMOS) or the like to process a high quality image such as a VGA format (640×480 pixels) in a small area (3.6×2.7 mm). The image sensor can convert a light incident thereon into analog electrical signals that can be further converted into digital form. The lens module is formed over the image sensor for focusing the incident light onto the corresponding image sensor. Furthermore an additional optical module, such as a filter, can be attached to the lens module to improve exposure and specific color filtering.

In recent years, miniaturization of electronic devices has continued apace. Digital camera modules are often mounted on these small portable electronic devices, thus making miniaturization of the camera modules used with electronic devices necessary. The conventional way to attach an additional optical module, such as a filter, to the digital camera module is by screwing the optical module onto the digital camera module onto a screw thread thereof. However, since the digital camera module is small, it is difficult for users to screw the additional optical module onto the digital camera module. In addition, digital camera module barrels are usually made of plastic and frequent screwing and unscrewing may cause damage to the plastic barrel.

What is needed, therefore, is an electronic device with a portable optical module. The portable optical module should be easy to attach to and detach from the digital camera module of an electronic device such as a mobile phone, a notebook or a personal digital assistant.

SUMMARY OF THE INVENTION

An electronic device with a portable optical module is provided. In one embodiment, the electronic device includes a main body having a camera module incorporated therein, an optical element, a holder and a magnetic assembly. The optical element can be an optical filter. The holder is annular-shaped and defines a through hole therein for accommodating the optical element. The magnetic assembly includes a first part coupled to the holder and a second part coupled to the camera module. The first part is configured for magnetic attachment to the second part, thus removably coupling the holder with the optical element to the camera module.

Advantages and novel features of the present electronic device with a portable optical module will become more apparent from the following detailed description of preferred embodiments when taken in conjunction with the accompanying drawing.

BRIEF DESCRIPTION OF THE DRAWING

The components in the drawing are not necessarily drawn to scale, the emphasis instead being placed upon clearly illustrating the principles of the present invention.

DETAILED DESCRIPTION OF THE INVENTION

Figure 1:
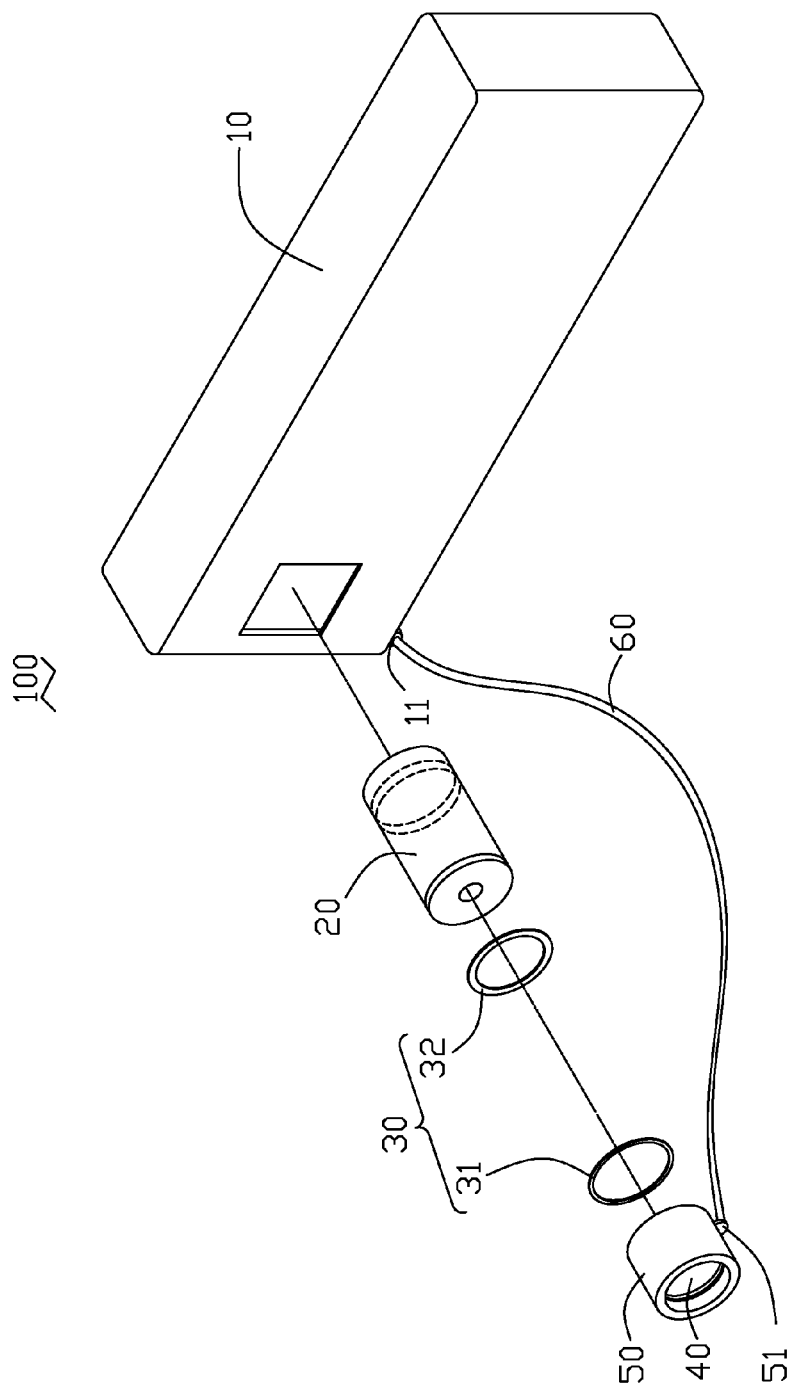
FIG. 1 is an exploded, isometric view of an electronic device with a portable optical module in accordance with a preferred embodiment of the present invention; and Corresponding reference characters indicate corresponding parts throughout the diagram. The exemplifications set out herein illustrate at least one preferred embodiment of the present electronic device with a portable optical module, in one form, and such exemplifications are not to be construed as limiting the scope of the invention in any manner.

Reference will now be made to the drawing to describe embodiments of the present portable optical module in detail.

Referring to FIG. 1, an electronic device with a portable optical module 100 includes a main body 10 having a camera module 20 incorporated therein, an optical element 40, a holder 50 and a magnetic assembly 30. The electronic device 100 is a portable electronic device having photographic functions, such as, for example, a mobile phone, a notebook or a personal digital assistant.

The optical element 40 provides additional optical functions for the camera module 20, such as filtering infra-red light, ultraviolet light, etc. For example, the optical element 40 can be chosen from the group consisting of absorptive filters, monochromatic filters, infrared filters, ultraviolet filters, neutral density filters, longpass filters and shortpass filters, or any combination thereof. The optical element 40 can be fixed inside the holder 50 by adhesion or with a mechanical buckle.

The holder 50 should preferably be annular-shaped and defines a through hole therein for accommodating the optical element 40 therein. In the preferred embodiment of the invention, the optical element 40 is fixed in the holder 50 using adhesive applied to each periphery of the optical element 40 that has a significantly small area and is placed in a threaded inner surface of the holder 50. The holder 50 can be a metal or plastic tube with a blackened inner surface in which the optical element 40 is contained and fixed.

The magnetic assembly 30 includes a first part 31 coupled to the holder 50 and a second part 32 coupled to the camera module 20. The first part 31 is configured for magnetically attached to the second part 32, thus removably coupling the holder 50 with the optical element 40 to the camera module 20. On one side of the holder 50, the first part 31 is attached thereon by adhesion or metallurgical means. The first part 31 can be annular-shaped or any other shape that can conform to the shape of the holder 50. The first part 31 is comprised of the group selected from permanently magnetic and ferromagnetic materials that exhibit magnetic properties, such as iron, some steels and naturally occuring magnetic minerals.

The second part 32 is attached to the camera module 20 by adhesion or metallurgical means. The second part 32 can be annular-shaped or any other shape that can conform to the shape of the camera module 20. The second part 32 can be made of a material selected from the group consisting of permanent magnets and ferromagnetic materials that exhibit magnetic properties, such as iron, some steels and the naturally occuring magnetic minerals.

The first part 31 and the second part 32 should be attracted to each other by magnetic force. Therefore, the optical element 40 can be put on or taken off from the camera module 20 easily. The holder 50 further includes a fastening member 51 thereon for connecting with the main body 10 at the fastening member 11 via a connecting wire 60.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. An electronic device with a portable optical module, comprising:
    a main body having a camera module incorporated therein;
    an optical element;
    a holder for holding the optical element; and
    a magnetic assembly including a first part coupled to the holder and a second part coupled to the camera module; the first part being configured for magnetic attachment to the second part, thus removably coupling the holder with the optical element to the camera module.

2. The electronic device with a portable optical module as claimed as claim 1, wherein the optical element is an optical filter selected from the group consisting of absorptive filters, monochromatic filters, infrared filters, ultraviolet filters, neutral density filters, longpass filters and shortpass filters.

3. The electronic device with a portable optical module as claimed as claim 1, wherein the optical element is fixed in the holder using adhesive.

4. The electronic device with a portable optical module as claimed as claim 1, wherein the holder is annular-shaped and defines a through hole therein for accommodating the optical element therein.

5. The electronic device with a portable optical module as claimed as claim 1, wherein the holder further comprises a fastening member thereon for connecting with the main body via a connecting wire.

6. The electronic device with a portable optical module as claimed as claim 1, wherein the first part is annular-shaped for conforming to the shape of the holder.

7. The electronic device with a portable optical module as claimed as claim 1, wherein the first part is fixed in the holder with adhesive.

8. The electronic device with a portable optical module as claimed as claim 1, wherein the first part is made of a material selected from the group consisting of permanent magnets and ferromagnetic materials.

9. The electronic device with a portable optical module as claimed as claim 1, wherein the second part is annular-shaped for conforming to the shape of the camera module.

10. The electronic device with a portable optical module as claimed as claim 1, wherein the second part is attached to the camera module using adhesive.

11. The electronic device with a portable optical module as claimed as claim 1, wherein the second part is comprised of the group selected from permanently magnetic and ferromagnetic materials.

* * * * *